(No Model.)
W. WELLS.
APPARATUS FOR GENERATING AND TRANSMITTING HEAT.
No. 248,625. Patented Oct. 25, 1881.
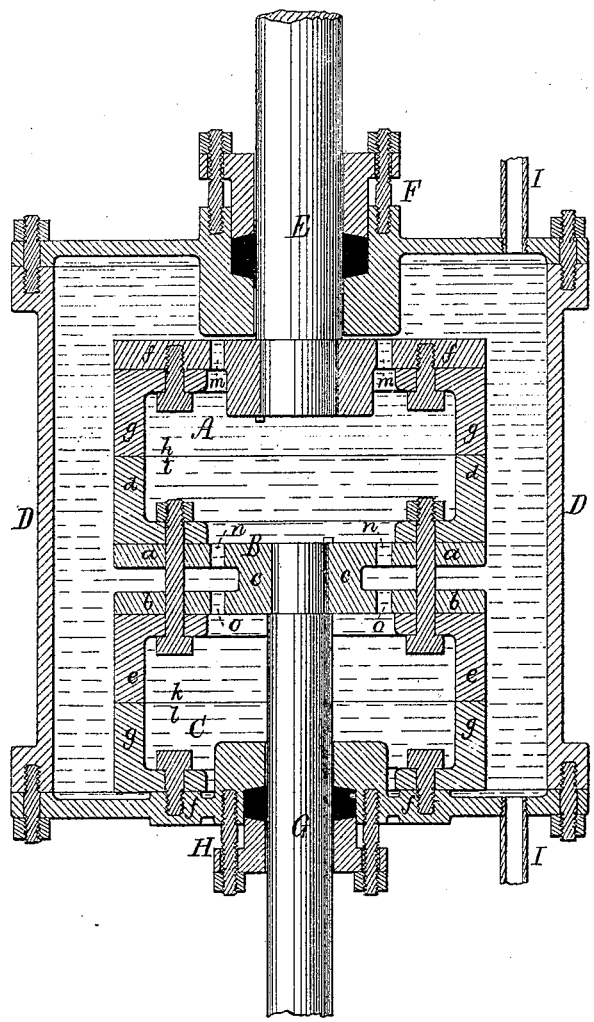
Witnesses
Wm H. Preston
S. N. Piper
Inventor
Webster Wells
by R. H. Eddy atty.

UNITED STATES PATENT OFFICE.

WEBSTER WELLS, OF BOSTON, MASSACHUSETTS, ASSIGNOR TO NATIONAL FRICTION HEATER COMPANY, OF CONCORD, NEW HAMPSHIRE.

APPARATUS FOR GENERATING AND TRANSMITTING HEAT.

SPECIFICATION forming part of Letters Patent No. 248,625, dated October 25, 1881.

Application filed February 10, 1881. (No model.)

*To all whom it may concern:*

Be it known that I, WEBSTER WELLS, of Boston, of the county of Suffolk and State of Massachusetts, have invented a new and useful Machine or Apparatus for Generating and Transmitting Heat; and I do hereby declare the same to be described in the following specification, and represented in the accompanying drawing, which is a vertical section of it.

This machine or apparatus, besides embodying the mechanical principle of that described in Letters Patent of the United States numbered 187,242, and granted to me on February 13, 1877, contains novel and important features, whereby its utility and practical results are greatly increased. It consists mainly of three friction and heat generators, adapted for use substantially in the manner and for the purpose as set forth; and it further consists in the combination of such heat-generators with a tank or surrounding closed vessel and one or more heat-radiators and transmitting-conduits. As represented, the generators are chambered, and the chambers open into each other and the tank or surrounding closed vessel, in order for water, when in the said tank or vessel, to flow freely into and out of the chambers, such water also being to surround the generators, or to be in contact with their outer surfaces. Heat produced by the generators will be absorbed by the water, and will cause it to flow through the radiator, so as to heat it, the water, after losing all or most of its heat, returning to the tank or vessel from which it previously escaped by the conducting-radiator. The said heat may be utilized for warming the air next to and adjacent to the radiator. Furthermore, independently of the radiator, the generators and the encompassing vessel or tank may be employed for heating water, so as to vaporize it or convert it into steam to be removed from the vessel by suitable means for being utilized as occasion may require.

In the drawing, A B C are the three frictional heat-generators, and D their surrounding tank or vessel.

The middle generator, B, as shown, is composed not only of two disks, $a\ b$, and their connecting-hub $c$, arranged as represented, but of two chambered cylinders, $d\ e$, which are bolted or fixed to the disks $a\ b$, and extend from them in manner as shown.

Each of the exterior generators, A C, consists of a disk, $f$, and a hollow cylinder, $g$, arranged and bolted or fixed together, as represented. The lower generator, C, is fastened to the bottom of the tank, so as to be stationary within such tank and to stand somewhat above the inner surface of the bottom. The upper generator, A, is fixed concentrically upon a vertical shaft, E, extending up through a stuffing-box, F, applied to the top of the tank.

The middle or intermediate generator, B, is fastened upon the upper end of a shaft, G, which extends through a stuffing-box, H, adapted to the bottom of the tank. The upper generator and its shaft are to be stationary, except in being movable vertically, and they are to have some suitable means of pressing them downward, so as to force the said upper generator into contact with the intermediate generator, and the latter into contact with the lower and stationary generator, the annular edges in contact being shown at $h\ i\ k\ l$. Openings $m\ n\ o$, made through the heads of the generators, lead from their chambers or internal spaces into the tank, in order for water to flow therefrom freely into and out of and through the said chambers.

The radiator shown at I in the drawing may be supposed to be a pipe or conduit arranged outside of the tank and having one end opening into the tank at its top and the other into the tank at its bottom, as shown.

I do not confine my invention to any specific form or construction of radiator, so long as it will suffice to transmit water or a fluid to be heated from and return it to the tank, the transmission or movement of the water from the tank being due to the heat generated in the water.

Instead of a continuous pipe the radiator may be a hollow cylinder or other proper vessel or structure suitably connected with the tank by pipes leading into it.

In the operation of the above-described frictional heat-generating machine or apparatus the intermediate generator is to be put in rapid revolution by some proper motor duly applied to its shaft. By movement of the intermediate generator against the two other generators friction and heat will result, such heat being absorbed by the water in contact with the generators, whereby such water will be raised in temperature, and may be utilized to advantage for the dissemination of heat, steam, or vapor, as circumstances may require. The apparatus without the radiator may be used for heating air.

What I claim as my invention is as follows:

1. The combination of the three frictional heat-generators A B C, adapted and for use substantially in manner and for the purpose as set forth.

2. The described frictional heat-generators, chambered and arranged in a tank or surrounding vessel, and adapted thereto and to each other by means as set forth, and provided with openings for communicating with one another and the tank, substantially as set forth.

3. The combination of the tank and a radiator, as explained, with the described frictional heat-generators, adapted and for use with each other by means as set forth, and arranged in the tank substantially as specified.

4. The combination of the tank provided with stuffing-boxes at its two opposite ends, with the three frictional heat-generators and their shafts, constructed, arranged, and adapted substantially as set forth.

WEBSTER WELLS.

Witnesses:
EMILY W. WELLS,
KATE W. LANGDON.